US011422261B2

(12) United States Patent
Liu et al.

(10) Patent No.: US 11,422,261 B2
(45) Date of Patent: Aug. 23, 2022

(54) ROBOT RELOCALIZATION METHOD AND APPARATUS AND ROBOT USING THE SAME

(71) Applicant: UBTECH ROBOTICS CORP LTD, Shenzhen (CN)

(72) Inventors: Zhichao Liu, Shenzhen (CN); Youjun Xiong, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 325 days.

(21) Appl. No.: 16/699,750

(22) Filed: Dec. 2, 2019

(65) Prior Publication Data
US 2021/0063577 A1 Mar. 4, 2021

(30) Foreign Application Priority Data

Aug. 26, 2019 (CN) .......................... 201910791445.9

(51) Int. Cl.
G01S 17/00 (2020.01)
G01S 17/89 (2020.01)
G01S 7/48 (2006.01)
G05D 1/02 (2020.01)
G05D 1/00 (2006.01)

(52) U.S. Cl.
CPC ............ G01S 17/89 (2013.01); G01S 7/4808 (2013.01); G05D 1/0231 (2013.01); G05D 1/0016 (2013.01); G05D 1/0088 (2013.01)

(58) Field of Classification Search
CPC ...... G01S 17/89; G01S 7/4808; G01S 7/4802; G01S 17/08; G05D 1/0231; G05D 1/0016; G05D 1/0088; G05D 2201/02; G05D 1/0044; G05D 1/024; G05D 1/0274; B25J 9/1602; B25J 9/161; G01C 21/00; G06F 16/29
See application file for complete search history.

(56) References Cited

U.S. PATENT DOCUMENTS

| 8,798,357 | B2 * | 8/2014 | Sinha ..................... G06V 20/10 |
| | | | 382/154 |
| 9,031,809 | B1 * | 5/2015 | Kumar .................... G06T 7/285 |
| | | | 702/150 |
| 9,170,334 | B2 * | 10/2015 | Baldwin ................. G01S 7/497 |
| 10,319,146 | B2 * | 6/2019 | Steinbach ............ G01C 21/206 |

(Continued)

*Primary Examiner* — Peter D Nolan
*Assistant Examiner* — Peter Y Ning

(57) ABSTRACT

The present disclosure provides a robot relocalization method including: obtaining a level feature of an object in a laser map and calculating a first pose list; matching a laser subgraph point cloud collected by the robot with the first pose list to obtain a second pose list, if a distance between the level feature of the object and an initial position of a relocation of the robot is smaller than a threshold; splicing the laser subgraph point cloud into subgraphs, and performing a multi-target template matching to obtain a first matching candidate result; filtering the first matching candidate result based on the second pose list to obtain a second matching candidate result; determining a overlapping area of the second matching candidate result and the subgraph, and matching boundary points in the overlapping area with the laser subgraph point cloud to obtain the result of the relocation of the robot.

20 Claims, 6 Drawing Sheets

(56) References Cited

U.S. PATENT DOCUMENTS

| | | | |
|---|---|---|---|
| 2012/0121161 A1* | 5/2012 | Eade | G05D 1/0253 |
| | | | 901/1 |
| 2017/0048816 A1* | 2/2017 | Myeong | H04L 67/52 |
| 2018/0075643 A1* | 3/2018 | Sequeira | G05D 1/0274 |
| 2018/0088234 A1* | 3/2018 | Scherer | G01S 17/58 |
| 2018/0165544 A1* | 6/2018 | Isert | G05D 1/0231 |
| 2019/0094876 A1* | 3/2019 | Moore | G05D 1/024 |
| 2019/0329407 A1* | 10/2019 | Qi | G05D 1/0234 |
| 2020/0089236 A1* | 3/2020 | Doemling | G05D 1/0212 |
| 2020/0103915 A1* | 4/2020 | Holz | G01C 21/3673 |

\* cited by examiner

ROBOT RELOCALIZATION METHOD AND APPARATUS AND ROBOT USING THE SAME

CROSS REFERENCE TO RELATED APPLICATIONS

This application claims priority to Chinese Patent Application No. 201910791445.9, filed Aug. 26, 2019, which is hereby incorporated by reference herein as if set forth in its entirety.

BACKGROUND

1. Technical Field

The present disclosure relates to robot technology, and particularly to a robot relocalization method as well as an apparatus and a robot using the same.

2. Description of Related Art

At present, the mainstream simultaneous localization and mapping (SLAM) schemes for intelligent mobile service robots are all two-dimensional laser based SLAM schemes. Before the navigation starts, or after the localization is lost, the robot often encounters the problem of perceiving the surrounding environment and confirming the current position of the robot in the map according to the known map, that is, the relocation problem. The problem of improving the success rate of the relocation with mankind's help so as to add a restricted area for relocation to the entire large map refers to the local relocation problem. There are two types of solutions for the local relocation problem. One is the user specification, that is, the user controls the robot to move to a known fixed position (for example, each time the robot starts the navigation from the charging post after the first power-on), which is simple while the efficiency is low and has many constraints, and is rarely used; the other is the software algorithm processing, that is, the robot senses the surrounding environment through the sensor, and obtains the current position by itself through matching with the known map, which is complicated while has high efficiency and low-cost, and is often used.

Currently, the adaptive Monte Carlo localization (AMCL) method is the most widely used relocation method, which generates many guessed positions using probability models based on an initial estimated position provided by the user, obtains lidar data of the robot in real time to match and evaluate with the boundary points of the known maps so as to obtain a guessed optimal position, then use the guessed optimal position as an initial estimated value of the next cycle, and then the above-mentioned process is repeated until the guessed optimal position meets a determination condition to use the guessed optimal position as the final relocation result. The AMCL relocation method has low requirements on computing resources. In the case that the environment is constant and the features are obvious, it has high localization accuracy and small time consumption. However, in the case that the environment changes, it has low accuracy, high error rate, and large time consumption. In a practical application of the robot, the change of the scene is difficult to control, and the localization error is likely to cause serious navigation accidents. Therefore, the existing AMCL relocation method has a large security risk in the practical applications.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. It should be understood that, the described embodiments are part of the embodiments of the present disclosure, not all of the embodiments. All other embodiments obtained by those skilled in the art based on the embodiments of the present disclosure without creative efforts are within the scope of the present disclosure.

Figure 1:
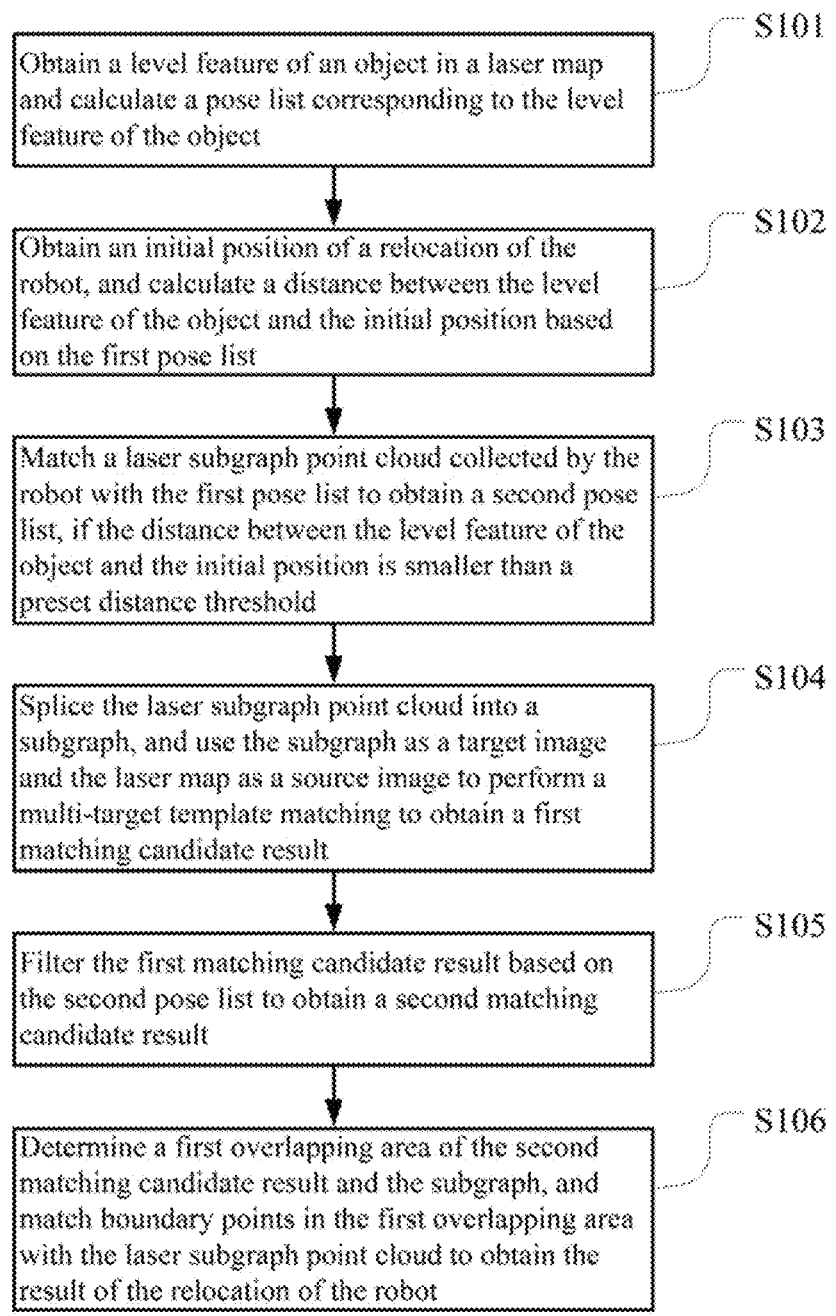
FIG. 1 is a flow chart of an embodiment of a robot relocalization method according to the present disclosure.
Figure 4:
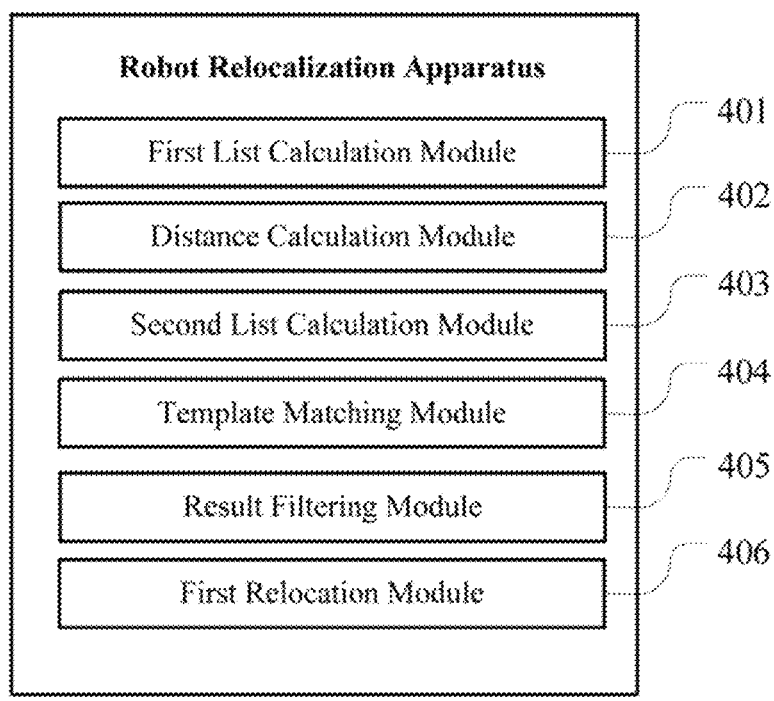
FIG. 4 is a schematic block diagram of an embodiment of a robot relocalization apparatus according to the present disclosure.
Figure 5:
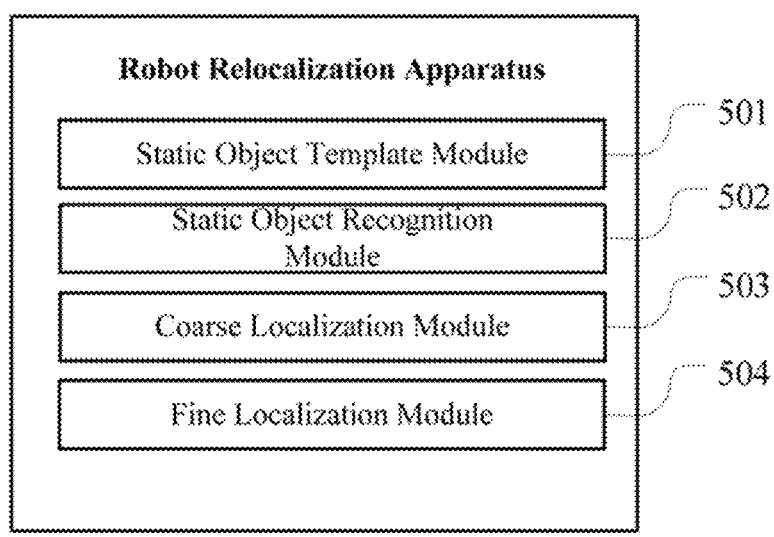
FIG. 5 is a schematic block diagram of another embodiment of a robot relocalization apparatus according to the present disclosure.
Figure 6:
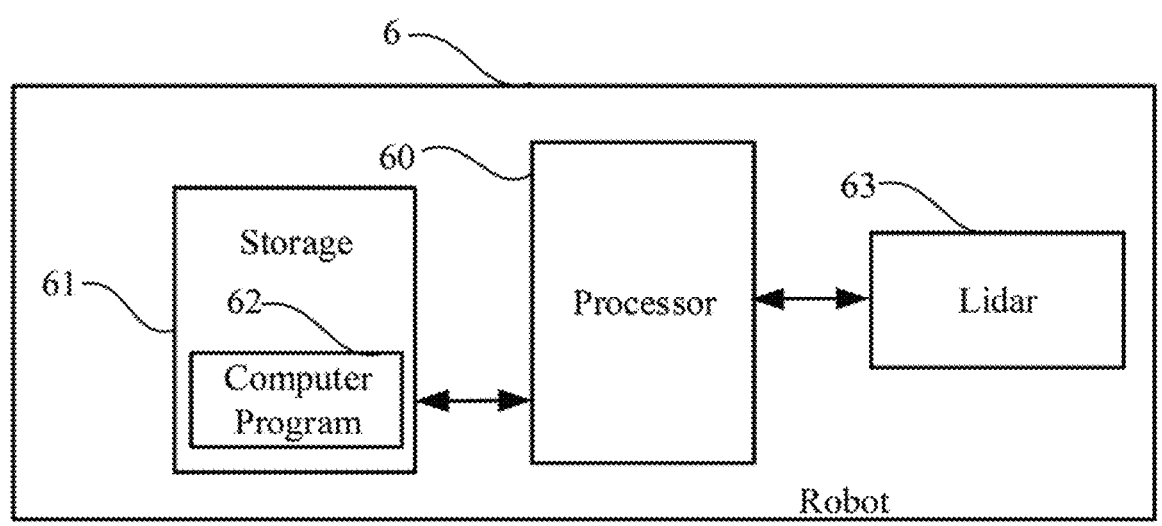
FIG. 6 is a schematic block diagram of an embodiment of a robot according to the present disclosure.

FIG. 1 is a flow chart of an embodiment of a robot relocalization method according to the present disclosure. In this embodiment, a relocalization method for a robot is provided. The method is a computer-implemented method executable for a processor, which may be implemented through and applied to a robot relocalization apparatus as shown in FIG. 4 or FIG. 5, a robot as shown in FIG. 6, or implemented through a computer readable storage medium. As shown in FIG. 1, the method includes the following steps.

S101: obtaining a level feature of an object in a laser map and calculating a pose list corresponding to the level feature of the object.

Figure 2:
FIG. 2 is a schematic diagram of a complete laser map according to an embodiment of the present disclosure.

The laser map is a complete laser map obtained through a mapping process in advance, and the level feature of the object can be selected by the user through a screen disposed on the robot in advance. FIG. 2 is a schematic diagram of a complete laser map according to an embodiment of the present disclosure. As shown in FIG. 2, a complete laser map can be displayed on the user interface to prompt the user to select a static level feature of the object in the laser map through an interactive tool such as a mouse or a keyboard, and the user can select an area in the laser map as the level feature of the object by using a rectangular frame. The environment corresponding to the area, for example, the walls and columns in a building that are indicated by the rectangular frame as shown in FIG. 2, is unchanged. Furthermore, in this embodiment, since the feature matching implementation will fail if the rectangular frame is too large, the maximum size of the rectangular frame can be set in advance, and the level feature of the object can be automatically select according to the maximum size in the case that the rectangular frame used by the user is larger than the maximum size.

Figure 3:
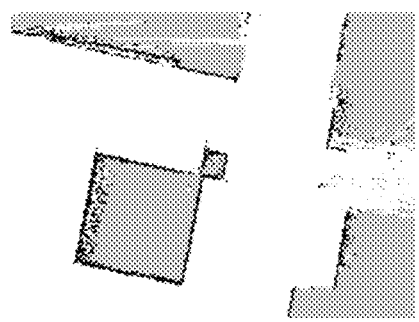
FIG. 3 is a schematic diagram of a region selected by a user in the laser map of FIG. 2 with a rectangular frame according to an embodiment of the present disclosure.

FIG. 3 is a schematic diagram of a region selected by a user in the laser map of FIG. 2 with a rectangular frame according to an embodiment of the present disclosure. After the level feature of the object is obtained, the corresponding pose thereof, that is, its coordinate in the laser map, can be calculated to form a feature template as shown in FIG. 3. It should be noted that, the amount of the level feature of the object that is selected by the user can be set according to actual needs, for example, it can be set to 1, 2, 3, 4 or other value. For each level feature of the object, the corresponding pose (a pose includes a position and a posture) can be calculated, and the pose can be stored in the form of a list, that is, the first pose list.

S102: obtaining an initial position of a relocation of the robot, and calculating a distance between the level feature of the object and the initial position based on the first pose list.

In this embodiment, before relocalizing the robot, the user may select an approximate position in the laser map where the robot is currently located in advance, and use the position as the initial position when the robot is relocated, thereby reducing the needed calculation amount for relocation.

After obtaining the initial position, the distance between the level feature of the object and the initial position can be calculated based on the coordinate in the first pose list. In this embodiment, the Euler distance calculation formula is adopted to calculate the distance. The distance threshold can be set in advance according to actual needs, for example, it can be set to 5 meters, 10 meters, 20 meters or other value.

S103: matching a laser subgraph point cloud collected by the robot with the first pose list to obtain a second pose list, if the distance between the level feature of the object and the initial position is smaller than a preset distance threshold.

The laser subgraph point cloud is a laser map boundary point cloud generated by the robot through rotating at a certain angle (e.g., a turn) at its current position. The robot can use a lidar to scan the surrounding environment to range the surrounding objects to obtain the boundary points. Each boundary point has angle and distance information that includes information of map boundaries (e.g., obstacles) at that angle. In this embodiment, a voxel filtering processing is performed on the laser subgraph point cloud in advance.

In this embodiment, the laser subgraph point cloud is matched with the first pose list using the iterative closest point (ICP) algorithm to obtain the second pose list. The iterative closest point algorithm is a commonly used matching method which mainly includes the following steps: (1) calculating a closest point set; (2) calculating a transformation matrix; (3) applying the transformation matrix; (4) performing an objective function calculation and a convergence determination. When a convergence condition is met, the iteration ends, otherwise it returns to step (1) to continue the iterative calculation. The unsuccessful ICP matching may include that the convergence condition is not met when the amount of the iterations reaches the maximum set value, or the overlapping degree between the convergence result obtained after applying the transformation matrix to the source point set and the target point set does not meet the requirement after the convergence condition is met and the iteration is ended. In this embodiment, the poses in the first pose list that are successful in the ICP matching with the laser subgraph point cloud are selected to store in the form of a list, that is, the second pose list.

S104: splicing the laser subgraph point cloud into a subgraph, and using the subgraph as a target image and the laser map as a source image to perform a multi-target template matching to obtain a first matching candidate result.

In this embodiment, each laser subgraph point cloud can be spliced, and a map formed by all the boundary points, that is, the subgraph, is drawn based on the angle and distance information of each boundary point in the laser subgraph point cloud. In the subgraph, the area between the robot and the boundary points is an area allowing the robot to pass, that is, a free space. The area outside the boundary points is unknown or obscured by obstacles which do not allow the robot to pass, that is, a non-free space. The free space and the non-free space are separated by boundary points in the subgraph. In the subgraph, the free space, the non-free space, and the boundary points can be distinguished using different pixel values.

After the subgraph is obtained, it can take the subgraph as the target image and take the laser map as the source image to perform the multi-target template matching, thereby obtaining the first matching candidate result.

The template matching is a commonly used matching method, which stacks a preset template on a searched image, calculates indicators for evaluating the similarity between the template and the area on the searched image that is covered by the template, and pans the template after the calculation. Then, the above-mentioned process is repeated. Finally, it searches one or more of the areas which have the highest similarity to the template from all the areas according to all the calculated indicators to use as the result of the template matching.

Since the template matching only involves panning operations and rotations cannot be processed, while the direction of the subgraph is not necessarily consistent with the direction of the laser map, it may need to rotate. To reduce the possibility of missing the matching results, the subgraph or the laser map can be rotated to a plurality of angles to perform the template matching.

Since the calculation amount of the template matching is large, and the calculation amount problem will be particularly obvious when the size of the searched image is large. To reduce the time consumption of the relocation, the multi-target template matching can be accelerated using the image pyramid.

Since the amount of the results of the template matching may be more than one while there may be redundancy, in order to simplify the result and reduce the subsequent calculation amount, the results of the template matching can be selected using non-maximum value suppression to obtain the first matching candidate result. In other embodiments, the result of the template matching can also be directly used as the first matching candidate result.

S105: filtering the first matching candidate result based on the second pose list to obtain a second matching candidate result.

In this way, in the relocation process, the consideration of the level feature of the object is added, and the first matching candidate result is filtered through the second pose list, thereby obtaining a high-confidence matching candidate result, that is, the second matching candidate result.

S106: determining a first overlapping area of the second matching candidate result and the subgraph, and matching boundary points in the first overlapping area with the laser subgraph point cloud to obtain the result of the relocation of the robot.

In this embodiment, the second matching candidate result can be laid on the laser map to determine the overlapping area of the second matching candidate result and the subgraph, that is, the first overlapping area. Then, the Gauss-Newton algorithm is used to match the boundary points in the first overlapping area with the laser subgraph point cloud to obtain the result of the relocation of the robot. In which, the Gauss-Newton algorithm uses the Taylor series expansion formula to approximately substitute the nonlinear regression model, and then through multiple iterations to correct the regression coefficient for multiple times, so that the regression coefficient are continually approaching the optimal regression coefficient of the nonlinear regression model so as to minimize the sum of square of the residuals of the original model.

It should be noted that, the forging process is a processing flow for the case that the distance between the level feature of the object and the initial position calculated in step S102 is less than the distance threshold. If the distance between the level feature of the object and the initial position is larger than or equal to the distance threshold, it does not need to execute step S103 and step S105, and after the first matching candidate result is calculated in step S104, a second overlapping area of the first matching candidate result and the subgraph is directly determined, and boundary points in the second overlapping area are matched with the laser subgraph point cloud, thereby obtaining the result of the relocation of the robot. The specific matching process is similar to the process in step S106. For details, refer to the detailed description in step S106, which are not described herein.

In summary, in this embodiment, by obtaining a level feature of an object in a laser map and calculating a first pose list corresponding to the level feature of the object; obtaining an initial position of a relocation of the robot, and calculating a distance between the level feature of the object and the initial position based on the first pose list; matching a laser subgraph point cloud collected by the robot with the first pose list to obtain a second pose list, in response to the distance between the level feature of the object and the initial position being smaller than a preset distance threshold; splicing the laser subgraph point cloud into a subgraph, and using the subgraph as a target image and the laser map as a source image to perform a multi-target template matching to obtain a first matching candidate result; filtering the first matching candidate result based on the second pose list to obtain a second matching candidate result; and determining a first overlapping area of the second matching candidate result and the subgraph, and matching boundary points in the first overlapping area with the laser subgraph point cloud to obtain the result of the relocation of the robot, in the relocation process, the consideration of the level feature of the object is added, the matching candidate result is filtered through the level feature of the object, and the result of the relocation of the robot is obtained by further calculating based on the filtering result, which improves the success rate and precision of relocation in a complex environment, especially for a dynamic environment, which can meet the needs in practical use of the of robot in complex and dynamic situations.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 4 is a schematic block diagram of an embodiment of a robot relocalization apparatus according to the present disclosure. As shown in FIG. 4, a robot relocalization apparatus corresponding to the robot relocalization method of the above-mentioned embodiments of FIG. 4 is provided.

In this embodiment, the robot relocalization apparatus can include:

a first list calculation module 401 configured to obtain a level feature of an object in a laser map and calculate a pose list corresponding to the level feature of the object, where the level feature of the object is an area selected by the user in a rectangular frame in the laser map, and the environment corresponding to the area does not change;

a distance calculation module 402 configured to obtain an initial position of a relocation of the robot, and calculate a distance between the level feature of the object and the initial position based on the first pose list;

a second list calculation module 403 configured to match a laser subgraph point cloud collected by the robot with the first pose list to obtain a second pose list, in response to the distance between the level feature of the object and the initial position being smaller than a preset distance threshold;

a template matching module 404 to splice the laser subgraph point cloud into a subgraph, and use the subgraph as a target image and the laser map as a source image to perform a multi-target template matching to obtain a first matching candidate result;

a result filtering module 405 configured to filter the first matching candidate result based on the second pose list to obtain a second matching candidate result; and a first relocation module 406 configured to determine a first overlapping area of the second matching candidate result and the subgraph, and match boundary points in the first overlapping area with the laser subgraph point cloud to obtain the result of the relocation of the robot.

Furthermore, the robot relocalization apparatus may further include:

a second relocation module configured to determine a second overlapping area of the first matching candidate result and the subgraph in response to a distance between the level feature of the object and the initial position being greater than or equal to the distance threshold, and match boundary points in the second overlapping area with the laser subgraph point cloud to obtain the result of the relocation of the robot.

Furthermore, the first relocation module 406 is configured to match the boundary points in the first overlapping area with the laser subgraph point cloud using a Gauss-Newton algorithm to obtain the result of the relocation of the robot.

Furthermore, the second list calculation module is configured to match the laser subgraph point cloud with the first pose list using an iterative closest point algorithm to obtain the second pose list.

Furthermore, the robot relocalization apparatus may further include:

an acceleration module configured to accelerate the multi-target template matching using an image pyramid.

In this embodiment, each of the above-mentioned modules/units is implemented in the form of software, which can be computer program(s) stored in a memory of the relocalization apparatus and executable on a processor of the relocalization apparatus. In other embodiments, each of the above-mentioned modules/units may be implemented in the form of hardware (e.g., a circuit of the relocalization apparatus which is coupled to the processor of the relocalization apparatus) or a combination of hardware and software (e.g., a circuit with a single chip microcomputer).

Those skilled in the art can clearly understand that, for the convenience and brevity of the description, the specific working process of the above-mentioned apparatus, module and unit can refer to the corresponding process in the foregoing method embodiment, and details are not described herein again.

FIG. 5 is a schematic block diagram of another embodiment of a robot relocalization apparatus according to the present disclosure. As shown in FIG. 5, another robot relocalization apparatus provided by an embodiment of the present invention may include: a static object template module 501, a static object recognition module 502, a coarse localization module 503, and a fine localization module 504.

When relocalizing the robot, the static object template module 501 obtains a level feature of an object in a laser map, and calculates a first pose list corresponding to the level feature of the object. After the calculation is completed, the static object template module 501 transmits the first pose list to the static object recognition module. The static object recognition module 502 obtains an initial position of a relocation of the robot, and calculates a distance between the level feature of the object and the initial position based on the first pose list.

If the distance between the level feature of the object and the initial position is smaller than a preset distance threshold, the static object recognition module 502 matches a laser subgraph point cloud collected by the robot with the first pose list to obtain a second pose list, and transmits the second pose list to the fine localization module 504. The coarse localization module 503 splices the laser subgraph point cloud into a subgraph, uses the subgraph as a target image and the laser map as a source image to perform a multi-target template matching to obtain a first matching candidate result, and transmit the first matching candidate result to the fine localization module 504; the fine localization module 504 filters the first matching candidate result based on the second pose list to obtain a second matching candidate result after receiving the second pose list and the first matching candidate result, and determines a first overlapping area of the second matching candidate result and the subgraph, and match boundary points in the first overlapping area with the laser subgraph point cloud to obtain the result of the relocation of the robot.

If a distance between the level feature of the object and the initial position being greater than or equal to the distance threshold and determine, the static object identification module 502 transmits a notification message to the fine localization module 504 and no longer transmits the second pose list to the fine localization module 504. The coarse localization module 503 splices the laser subgraph point cloud into a subgraph, then performs a multi-target template matching using the subgraph as a target image and the laser map as a source image to obtain a first matching candidate result, and transmits the first matching candidate result to the fine localization module 504. After receiving the first matching candidate result, the fine localization module 504 determines a second overlapping area of the first matching candidate result and the subgraph, and matches boundary points in the second overlapping area with the laser subgraph point cloud to obtain the result of the relocation of the robot.

In the above-mentioned embodiments, the description of each embodiment has its focuses, and the parts which are not described or mentioned in one embodiment may refer to the related descriptions in other embodiments.

FIG. 6 is a schematic block diagram of an embodiment of a robot according to the present disclosure. For convenience of description, only parts related to this embodiment are shown.

As shown in FIG. 6, in this embodiment, the robot 6 includes a processor 60, a storage 61, a computer program 62 stored in the storage 61 and executable on the processor 60, and a lidar 63. When executing (instructions in) the computer program 62, the processor 60 implements the steps in the above-mentioned embodiments of the robot relocalization method, for example, steps S101-S106 shown in FIG. 1. Alternatively, when the processor 60 executes the (instructions in) computer program 62, the functions of each module/unit in the above-mentioned device embodiments, for example, the functions of the modules 401-406 shown in FIG. 4 are implemented, or the functions of the modules 501-504 shown in FIG. 5 are implemented.

Exemplarily, the computer program 62 may be divided into one or more modules/units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the robot 6.

It can be understood by those skilled in the art that FIG. 6 is merely an example of the robot 6 and does not constitute a limitation on the robot 6, and may include more or fewer components than those shown in the figure, or a combination of some components or different components. For example, the robot 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the robot 6, for example, a hard disk or a memory of the robot 6. The storage 61 may also be an external storage device of the robot 6, for example, a plug-in hard disk, a smart media card (SMC), a secure digital (SD) card, flash card, and the like, which is equipped on the robot 6. Furthermore, the storage 61 may further include both an internal storage unit and an external storage device, of the robot 6. The storage 61 is configured to store the computer program 62 and other programs and data required by the robot 6. The storage 61 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented relocalization method for a robot, comprising executing on a processor steps of:

obtaining a level feature of an object in a laser map and calculating a first pose list corresponding to the level feature of the object, wherein the level feature of the object is an area selected by a user with a rectangular frame in the laser map, environment corresponding to the area does not change, the laser map is a complete laser map obtained through a mapping process, and the first pose list comprises: a coordinate of the level feature of the object in the laser map, and a posture of the level feature of the object;

obtaining an initial position of a relocation of the robot, and calculating a distance between the level feature of the object and the initial position based on the first pose list;

determining whether the distance between the level feature of the object and the initial position is smaller than a preset distance threshold;

matching a laser subgraph point cloud collected by the robot with the first pose list to obtain a second pose list, in response to the distance between the level feature of the object and the initial position being smaller than the preset distance threshold;

splicing the laser subgraph point cloud into a subgraph, and using the subgraph as a target image and the laser map as a source image to perform a multi-target template matching to obtain a first matching candidate result;

filtering the first matching candidate result based on the second pose list to obtain a second matching candidate result;

determining a first overlapping area of the second matching candidate result and the subgraph, and matching boundary points in the first overlapping area with the laser subgraph point cloud to obtain the result of the relocation of the robot; and determining a second overlapping area of the first matching candidate result and the subgraph in response to a distance between the level feature of the object and the initial position being greater than or equal to the distance threshold, and matching boundary points in the second overlapping area with the laser subgraph point cloud to obtain the result of the relocation of the robot.

2. The method of claim 1, wherein the step of matching the boundary points in the first overlapping area with the laser subgraph point cloud to obtain the result of the relocation of the robot comprises:

matching the boundary points in the first overlapping area with the laser subgraph point cloud using the Gauss-Newton algorithm to obtain the result of the relocation of the robot.

3. The method of claim 1, wherein the step of matching the laser subgraph point cloud collected by the robot with the first pose list to obtain the second pose list comprises:

matching the laser subgraph point cloud with the first pose list using an iterative closest point algorithm to obtain the second pose list.

4. The method of claim 1, wherein the step of performing the multi-target template matching further comprises:

accelerating the multi-target template matching using an image pyramid.

5. The method of claim 1, wherein the robot has a lidar, and the method further comprises:

scanning, through the lidar, a surrounding environment of the robot to range one or more surrounding objects to obtain the boundary points.

6. A relocalization apparatus for a robot, comprising:

a first list calculation module configured to obtain a level feature of an object in a laser map and calculate a pose list corresponding to the level feature of the object, wherein the level feature of the object is an area selected by a user in a rectangular frame in the laser map, environment corresponding to the area does not change, the laser map is a complete laser map obtained through a mapping process, and the first pose list comprises: a coordinate of the level feature of the object in the laser map, and a posture of the level feature of the object;

a distance calculation module configured to obtain an initial position of a relocation of the robot, calculate a distance between the level feature of the object and the initial position based on the first pose list, and determine whether the distance between the level feature of the object and the initial position is smaller than a preset distance threshold;

a second list calculation module configured to match a laser subgraph point cloud collected by the robot with the first pose list to obtain a second pose list, in response to the distance between the level feature of the object and the initial position being smaller than the preset distance threshold;

a template matching module configured to splice the laser subgraph point cloud into a subgraph, and use the subgraph as a target image and the laser map as a source image to perform a multi-target template matching to obtain a first matching candidate result;

a result filtering module configured to filter the first matching candidate result based on the second pose list to obtain a second matching candidate result;

a first relocation module configured to determine a first overlapping area of the second matching candidate result and the subgraph, and match boundary points in the first overlapping area with the laser subgraph point cloud to obtain the result of the relocation of the robot; and a second relocation module configured to determine a second overlapping area of the first matching candidate result and the subgraph in response to a distance between the level feature of the object and the initial position being greater than or equal to the distance threshold, and match boundary points in the second overlapping area with the laser subgraph point cloud to obtain the result of the relocation of the robot.

7. A robot, comprising:
a lidar;
a memory;
a processor; and
one or more computer programs stored in the memory and executable on the processor, wherein the one or more computer programs comprise:

instructions for obtaining a level feature of an object in a laser map and calculating a first pose list corresponding to the level feature of the object, wherein the level feature of the object is an area selected by a user with a rectangular frame in the laser map, environment corresponding to the area does not change, the laser map is a complete laser map obtained through a mapping process, and the first pose list comprises: a coordinate of the level feature of the object in the laser map, and a posture of the level feature of the object;

instructions for obtaining an initial position of a relocation of the robot, and calculating a distance between the level feature of the object and the initial position based on the first pose list;

instructions for determining whether the distance between the level feature of the object and the initial position is smaller than a preset distance threshold;

instructions for matching a laser subgraph point cloud collected by the robot with the first pose list to obtain a second pose list, in response to the distance between the level feature of the object and the initial position being smaller than the preset distance threshold;

instructions for splicing the laser subgraph point cloud into a subgraph, and using the subgraph as a target image and the laser map as a source image to perform a multi-target template matching to obtain a first matching candidate result;

instructions for filtering the first matching candidate result based on the second pose list to obtain a second matching candidate result;

instructions for determining a first overlapping area of the second matching candidate result and the subgraph, and matching boundary points in the first overlapping area with the laser subgraph point cloud to obtain the result of the relocation of the robot; and instructions for determining a second overlapping area of the first matching candidate result and the subgraph in response to a distance between the level feature of the object and the initial position being greater than or equal to the distance threshold, and matching boundary points in the second overlapping area with the laser subgraph point cloud to obtain the result of the relocation of the robot.

8. The robot of claim 7, wherein the instructions for matching the boundary points in the first overlapping area with the laser subgraph point cloud to obtain the result of the relocation of the robot comprise:

instructions for matching the boundary points in the first overlapping area with the laser subgraph point cloud using the Gauss-Newton algorithm to obtain the result of the relocation of the robot.

9. The robot of claim 7, wherein the instructions for matching the laser subgraph point cloud collected by the robot with the first pose list to obtain the second pose list comprise:
instructions for matching the laser subgraph point cloud with the first pose list using an iterative closest point algorithm to obtain the second pose list.

10. The robot of claim 7, wherein the step of performing the multi-target template matching further comprises:
instructions for accelerating the multi-target template matching using an image pyramid.

11. The robot of claim 7, wherein the robot has a lidar, and the one or more computer programs further comprise:
instructions for scanning, through the lidar, a surrounding environment of the robot to range one or more surrounding objects to obtain the boundary points.

12. The method of claim 1, wherein the method further comprises:
displaying the laser map on a screen disposed on the robot, and prompting the user to select the level feature of the object in the laser map through an interactive tool.

13. The method of claim 1, wherein the method further comprises:
setting a maximum size of the rectangular frame, wherein the level feature of the object is automatically selected according to the maximum size when a rectangular frame used by the user is larger than the maximum size.

14. The method of claim 1, wherein a number of the level feature of the object is at least one.

15. The method of claim 1, wherein the step of obtaining the initial position of the relocation of the robot comprises:
obtaining a position selected by the user as the initial position of the relocation of the robot.

16. The method of claim 1, wherein the step of calculating the distance between the level feature of the object and the initial position based on the first pose list comprises:
calculating the distance between the level feature of the object and the initial position based on the coordinate in the first pose list by using a Euler distance calculation formula.

17. The method of claim 5, wherein the laser subgraph point cloud is a laser map boundary point cloud generated by the robot through rotating at a preset angle at a current position of the robot; and
each of the boundary points has an angle and distance information that comprises information of map boundaries at the angle; and
wherein before the step of matching the laser subgraph point cloud collected by the robot with the first pose list to obtain the second pose list, the method further comprises:
performing a voxel filtering processing on the laser subgraph point cloud.

18. The method of claim 17, wherein the step of splicing the laser subgraph point cloud into the subgraph comprises:
forming a map by all the boundary points as the subgraph;
wherein the map is drawn based on the angle and the distance information of each of the boundary points in the laser subgraph point cloud, the subgraph comprises a free space and a non-free space;
the free space is an area between the robot and the boundary points, the non-free space is an area outside the boundary points, the free space allows the robot to pass, and the non-free space does not allow the robot to pass;
the free space and the non-free space are separated by the boundary points in the subgraph; and
the free space, the non-free space, and the boundary points are distinguished using different pixel values in the subgraph.

19. The method of claim 1, wherein the subgraph or the laser map are rotated to a plurality of angles to perform the multi-target template matching.

20. The method of claim 1, wherein when a plurality of results of the multi-target template matching are obtained, the plurality of results of the multi-target template matching are selected using a non-maximum value suppression to obtain the first matching candidate result.

* * * * *